Figure 1:
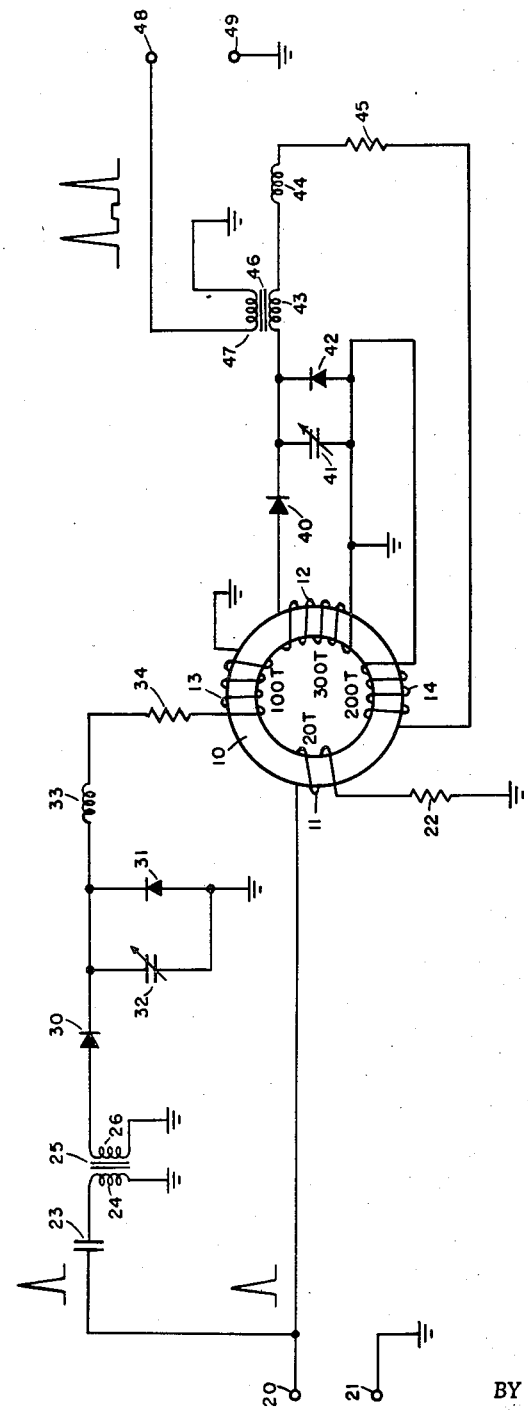

Aug. 16, 1960  N. L. WISEMAN  2,949,542
SCALE-OF-TWO PULSE COUNTING CIRCUIT
Filed June 18, 1958

INVENTOR.
NEIL L. WISEMAN
BY
Francis E. Blade
ATTORNEY

United States Patent Office 2,949,542
Patented Aug. 16, 1960

2,949,542

SCALE-OF-TWO PULSE COUNTING CIRCUIT

Neil L. Wiseman, Rochester, N.Y., assignor to General Dynamics Corporation, Rochester, N.Y., a corporation of Delaware Filed June 18, 1958, Ser. No. 742,806

5 Claims. (Cl. 307—88)

The present invention relates to electronic pulse counting circuits and, more particularly, to a scale-of-two pulse counting circuit which will provide one pulse output signal for every other pulse input signal.

Pulse scaling circuits are well known and the scale-of-two pulse counting circuit is particularly well known. These scaling circuits find many applications in modern electronic systems and are particularly useful in computer systems. Electronic computer systems are finding more and more applications in all types of complex gear and it is becoming increasingly more important to reduce the size and complexity of the pulse scaling circuits themselves to the absolute minimum.

It is a principal object of the present invention to provide an improved scale-of-two pulse counting circuit which is extremely simple and compact.

Another object of the invention is to provide an improved scale-of-two counting circuit which requires no power supply and functions entirely from the energy of the applied pulses.

Yet another object of the present invention is to provide an improved scale-of-two pulse counting circuit which does not use complicated components, such as vacuum tubes and transistors but, instead, is comprised of the simplest types of passive components, such as resistors, capacitors, diodes, and magnetic cores.

Prior to this invention, scale-of-two pulse counting circuits have been devised using magnetic cores with square hysteresis loop characteristics but so far as is known, such prior arrangements all use two or more magnetic cores.

It is another very important object of this invention to provide a simple and compact scale-of-two pulse counting circuit employing a single magnetic core with square hysteresis loop characteristics.

Further objects and advantages of the invention will be apparent with reference to the following specification and drawing in which the sole figure is a schematic diagram.

The scale-of-two pulse counting circuit of the invention is arranged to function entirely without a power supply and uses passive elements arranged in a circuit to function from the energy of the applied pulses in its operation. The magnetic core 10 having square hysteresis loop characteristics is provided with an input winding 11, an output winding 12, a first bias winding 13, and a second bias winding 14. Magnetic cores having square hysteresis loop characteristics are well known and need not be described in detail herein except to note that the core is capable of assuming two remanence states which may be simply referred to as a zero state and a one state, and that pulse energy provided to a respective winding with sufficient polarity, amplitude, and duration with relation to the direction of the winding on the core will cause the core to assume a given state of remanence. For example, assuming the core is in a zero state of remanence, then the core would switch from the zero state to the one state when a pulse of the correct polarity, amplitude, and duration is applied to the associated winding. Of course, the reversing of the polarity of the pulse would have the effect of switching the core from the one state to the zero state under the conditions mentioned, and each time the core switches its state, energies may be induced in other windings on the core, as is well known.

Input terminals 20 and 21, with terminal 21 grounded, may be connected to a source of pulses of sufficient amplitude and polarity such that when applied and thereby connected to the input winding 11 in series with the ballast resistor 22 and ground will cause the core 10 to switch from the zero state to the one state under the condition in which the winding 11 is wound in the direction shown. Each input pulse applied across the input terminals 20 and 21 is also coupled by the coupling capacitor 23 to the primary winding 24 of transformer 25. The secondary winding 26 of transformer 25 is connected through a delay circuit to the first bias winding 13 on the core 10. The delay circuit, which may comprise the series diode 30, the parallel diode 31, and parallel adjustable capacitor 32 together with the series inductance 33 and load resistance 34, is provided to delay the application of the input pulse induced in the secondary winding 26 of transformer 25 to the bias winding 13 until after the corresponding input pulse applied to the input winding 11 has decayed. The capacitor 32 may be adjustable to predetermine the exact amount of delay time referred to. The delayed pulse applied to the bias winding 13 is of such polarity, amplitude, and duration with relation to the direction and number of turns of the winding 13 as to shift the core 10 from the one state to the zero state if the core is in the one state at such time.

Considering now the operation of the invention as thus far described and assuming the magnetic core 10 to be initially in the one state, it will be apparent that a first input pulse applied across terminals 20 and 21 and through the input winding 11 would at first not switch the core 10 since the pulse applied to the winding 11 tends to switch the core to the one state which the core is already in. Since the core does not switch at this time, obviously, no currents are induced in any of the windings 12, 13 or 14. This same first input pulse, however, after a delay interval determined by the constants of the circuit including the capacitor 32 and the coil 33, will be applied to the bias winding 13 with a polarity for switching the core 10 from the one state to the zero state. At this time, when the core 10 switches from the one state to the zero state, the pulse induced in the input winding 11 may be effectively ignored since the number of turns in the input winding 11 is only twenty compared to the one hundred turns for the bias winding 13. In addition, the impedance to ground for the circuit including the input winding 11 is quite low and, therefore, no further reactions from the pulse induced at this time in the input winding 11 are encountered. Also at the time that the core 10 shifts from the one state to the zero state in response to the application of the delayed input pulse to the winding 13, the circulation of pulses induced in windings 12 and 14 is blocked by the polarity of diodes 40 and 42 so that substantially no pulse currents circulate through the input winding 43 of the output transformer 46. Thereafter, the second input pulse applied across the terminals 20 and 21 and the input winding 11 switches the core 10 from the zero state condition at that time to the one state. At this time, when the core 10 switches from the zero state to the one state, the pulse current induced in the winding 13 is shorted by the diode 31 to ground and may be ignored. Also at this time, the pulses induced in both the output winding 12 and the bias winding 14 aid each other and pass through the input winding 43 of the output transformer 46 to produce an output pulse across terminals 48 and 49. Upon the decay of the second input pulse applied to the input winding 11, as previously described in connection with the first input pulse, the delayed pulse applied to the first bias winding 13 would again tend to switch the core 10 back from the then switched one state to the zero state but this will be prevented by a delayed pulse simultaneously applied to the second bias winding 14 in a manner to now be described.

Each time the core 10 switches from the zero state to the one state, as previously mentioned, an output pulse will be induced in the output winding 12 of the correct polarity to be passed by the diode 40 to the delay circuit including the parallel connected variable capacitor 41 and diode 42 in series with the output transformer primary winding 43, delay inductance 44, and ballast resistance 45. Such output pulse induced in the primary winding 43 of the output transformer 46 induces an output pulse in the secondary winding 47 across output terminals 48 and 49. At the same time, the output pulse in the delay circuit, including transformer winding 43, inductance 44, resistance 45, and variable capacitor 41, is connected to the second bias winding 14 after a delay interval sufficient to assure its application to the bias winding to occur immediately after the decay of the input and output pulses on windings 11 and 12, respectively. The delayed pulse applied to the second bias winding 14 is of such polarity, amplitude, and duration with relation to the number and direction of turns for the bias winding 14 as to tend to switch the core 10 from the zero state to the one state. It will be noted that the delayed pulse applied to the second bias winding 14 is timed to occur simultaneously with the delayed pulse applied to the first bias winding 13 and since these two windings are oppositely wound on the core 10, their effects are canceled out and the core 10 is at that time not switched. Since at this time the core 10 does not switch, no other pulse currents are induced in windings 11 or 12.

To again review the complete operation of the invention, as described, it should now be apparent that every other input pulse to the input winding 11 will switch the core 10 from the zero state to the one state inducing an output pulse in the output winding 12 to be connected across the output terminals 48 and 49 upon the decay of every other input pulse. Each time an output pulse is produced, the core 10 is prevented from switching back from the one state to the zero state because of the simultaneous application of delayed pulses to the respective first and second bias windings 13 and 14. On alternate every other input pulses when the core 10 is in the one state, the core 10 will be switched back to the zero state upon decay of such input pulse when the delayed pulse is connected only to the first bias winding 13. This is because at that time no delayed pulse is applied to the second bias winding 14 since the pulses induced in the output winding 12 each time the core 10 switches from the one state to the zero state are not of the correct polarity to be passed by the diode 40 to the output delay circuit for the second bias winding 14.

While capacitors 32 and 41 are shown to be adjustable in order to enable the associated delay circuits to be adjusted to time the application of delay pulses to the first and second bias windings 13 and 14 to occur substantially simultaneously upon decay of the pulses in the input and output windings 11 and 12, it should be understood that other elements in the delay circuit may be selected to be adjustable as would be known by anyone skilled in the art.

The following table of component values may be given as an example of one operative arrangement of the invention although it should be understood that the invention is not to be limited to this choice of values since other circuit values may be chosen provided that they are related properly to the intended function of the circuit as is apparent to anyone skilled in the art. The pulses applied across terminals 20 and 21 are of positive polarity with respect to ground and may have a maximum amplitude of five volts, and the direction of the turns of the windings on the core 10 is shown in the drawing for such pulse polarity. Also, the polarity of the diode rectifying devices employed in the delay circuits and in the output circuit is indicated by the conventional symbol. The square hysteresis loop magnetic core 10 may, for example, bt that unit provided by the Arnold Engineering Company identified with its stock number 5P125-14. The input winding 11 may be provided with twenty turns, the output winding may be provided with three hundred turns, the first bias winding may be provided with one hundred turns, and the second bias winding may be provided with two hundred turns. The diode rectifying devices 30, 31 and 40, 42 are of the type identified as 1N305 and are germanium diodes manufactured by the Raytheon Manufacturing Company. Transformers 25 and 46 are typical potted core transformers. Transformer 25 may be a step-up transformer with a turns ratio of approximately three-to-one, while transformer 46 may be of any ratio except that its input winding 43 should be of low impedance to the pulses induced therein. In addition, the following listed component values are given:

Capacitor 23 _____ 16 mf.
Capacitor 32 _____ Average value .029 mmf.
Capacitor 41 _____ Average value .005 mmf.
Inductances 33 and 44 _____ 5.4 mh.
Resistor 22 _____ 10 ohms.
Resistor 34 _____ 120 ohms.
Resistor 45 _____ 330 ohms.

It should be understood that the invention is not limited to the particular circuit details described and that various modifications will occur to those skilled in the art within the spirit of the invention and the scope of the appended claims.

What is claimed is:

1. A scale of two pulse circuit comprising, a magnetic core having square hysteresis loop characteristics defining either a zero state or a one state for the core, an input winding on said core, a first bias winding on said core, a second bias winding on said core, an output winding on said core, first means to connect input pulses to said input winding in a sense to shift said core from the one state to the zero state, means including delay means to connect input pulses from said first means to said first bias winding in a sense to shift said core from the zero state to the one state after the decay of each input pulse, a pair of output terminals, means to connect an output pulse to said output terminals after the decay of each pulse induced in said output winding in response to the shifting of said core only from the one state to the zero state, and means to connect each output pulse from said output terminals to said second bias winding in a sense to shift said core from the one state to the zero state to thereby oppose and prevent the switching of the core in response to the pulse connected to said first bias winding upon the decay of each input pulse connected to said input winding that has switched the core from the one state to the zero state to induce the pulse in the output winding.

2. A scale of two pulse circuit comprising, a magnetic core having square hysteresis loop characteristics defining either a zero state or a one state for the core, an input winding on said core, a first bias winding on said core, a second bias winding on said core, an output winding on said core, first means to connect input pulses to said input winding in a sense to shift said core from the one state to the zero state, means including first delay means to connect input pulses from said first means to said first bias winding in a sense to shift said core from the zero state to the one state after the decay of each input pulse, a pair of output terminals, means including second delay means to connect an output pulse to said output terminals after the decay of each pulse induced in said output winding in response to the shifting of said core only from the one state to the zero state, and means to connect each output pulse from said output terminals to said second bias winding in a sense to shift said core from the one state to the zero state to thereby oppose and prevent the switching of the core in response to the pulse connected to said first bias winding upon the decay of each input pulse connected to said input winding that has switched the core from the one state to the zero state to induce the pulse in the output winding.

3. The invention of claim 1 in which said delay means is adjustable to predetermine the time of connection of each pulse to said first bias winding to occur only after the decay of each input pulse.

4. The invention of claim 2 in which said first delay means is adjustable to predetermine the time of connection of each pulse to said first bias winding to occur only after the decay of each input pulse.

5. The invention of claim 2 in which said first and second delay means are adjustable to predetermine the times of application of the pulses to said first and second bias windings, respectively, to occur only after the decay of each input pulse and each pulse induced in the output winding, respectively, and substantially simultaneously.

References Cited in the file of this patent

UNITED STATES PATENTS 2,813,260    Kaplan ---------------- Nov. 12, 1957